US011014550B2

(12) United States Patent
Siokos et al.

(10) Patent No.: US 11,014,550 B2
(45) Date of Patent: May 25, 2021

(54) DISTURBANCE MITIGATION TECHNIQUES FOR HYBRID POWER-SPLIT TRANSMISSIONS

(71) Applicant: FCA US LLC, Auburn Hills, MI (US)

(72) Inventors: Konstantinos Siokos, Rochester Hills, MI (US); Sandeep Makam, Rochester Hills, MI (US); Yang Liang, Troy, MI (US); Lurun Zhong, Troy, MI (US); Chinmaya Mittal, Columbus, IN (US)

(73) Assignee: FCA US LLC, Auburn Hills, MI (US)

(*) Notice: Subject to any disclaimer, the term of this patent is extended or adjusted under 35 U.S.C. 154(b) by 308 days.

(21) Appl. No.: 16/270,008

(22) Filed: Feb. 7, 2019

(65) Prior Publication Data

US 2020/0254993 A1 Aug. 13, 2020

(51) Int. Cl.
*B60W 20/15* (2016.01)
*B60W 10/08* (2006.01)
*B60L 15/20* (2006.01)
*B60K 6/26* (2007.10)

(52) U.S. Cl.
CPC ............... *B60W 20/15* (2016.01); *B60K 6/26* (2013.01); *B60L 15/20* (2013.01); *B60W 10/08* (2013.01); B60K 2006/268 (2013.01); B60L 2240/423 (2013.01); B60L 2250/28 (2013.01); B60W 2510/0638 (2013.01); B60W 2510/081 (2013.01); B60W 2510/083 (2013.01); B60W 2540/103 (2013.01); B60W 2710/083 (2013.01); B60Y 2200/92 (2013.01); B60Y 2300/205 (2013.01)

(58) Field of Classification Search
CPC ................. B60W 20/15; B60W 10/08; B60W 2510/0638; B60W 2510/081; B60W 2540/103; B60W 2710/083; B60L 15/20; B60L 2240/423; B60L 2250/28; B60L 50/16; B60L 2240/421; B60K 6/26; B60K 2006/268; B60Y 2200/92; B60Y 2300/205
See application file for complete search history.

(56) References Cited

U.S. PATENT DOCUMENTS

| 7,518,344 B2 | 4/2009 | Sihler |
| 9,899,941 B1 | 2/2018 | Wang et al. |
| 2012/0264555 A1* | 10/2012 | Robinette ............ B60K 6/365 475/5 |

(Continued)

*Primary Examiner* — Marthe Y Marc-Coleman
(74) *Attorney, Agent, or Firm* — Ralph E Smith

(57) ABSTRACT

A system and method for controlling a hybrid power-split transmission of a vehicle involve obtaining measured rotational speeds of an engine and an electric motor of the transmission, wherein the transmission comprises at least two input shafts having a gear set therebetween and an output shaft, wherein one input shaft is coupled to the engine and another input shaft is connected to the electric motor, determining a main torque profile for the electric motor based on a set of operating conditions of the vehicle, calculating a speed difference between the measured rotational speeds of the engine and the electric motor, determining a disturbance torque profile for the electric motor based on the calculated speed difference, and performing closed-loop control of the electric motor based on a combination of the main and disturbance torque profiles to mitigate a disturbance at the output shaft of the transmission.

18 Claims, 5 Drawing Sheets

(56) References Cited

U.S. PATENT DOCUMENTS

| | | | |
|---|---|---|---|
| 2013/0121805 A1* | 5/2013 | Carl | F04B 23/04 415/1 |
| 2013/0320935 A1 | 12/2013 | Freier et al. | |
| 2015/0251649 A1 | 9/2015 | Liang et al. | |
| 2015/0365032 A1 | 12/2015 | Katsumata | |
| 2016/0218650 A1 | 7/2016 | Gajanayake et al. | |

* cited by examiner

DISTURBANCE MITIGATION TECHNIQUES FOR HYBRID POWER-SPLIT TRANSMISSIONS

FIELD

The present application generally relates to hybrid transmissions and, more particularly, to techniques for mitigating disturbances in a hybrid power-split transmission of a hybrid vehicle during transient events.

BACKGROUND

A hybrid vehicle typically includes both an internal combustion engine and one or more electric motors. One specific type of hybrid vehicle includes a hybrid power-split transmission comprising an engine and at least one electric motor that are each coupled to a separate input shaft. Via a system of gears, the engine and the electric motor(s) are each capable of providing torque to an output shaft of the hybrid power-split transmission. These devices, however, do not always operate at the same frequency. The frequency of the engine, for example, depends on its firing rate. When rotational speed differences between the engine and the electric motor(s) occur, a disturbance (i.e., noise/vibration/harshness, or NVH) at the output shaft could occur. This disturbance could be continuous, often referred to as "rattle," or instantaneous, often referred to as "clunk," and could be felt by a driver of the vehicle, which is undesirable. Accordingly, while such hybrid transmission systems work well for their intended purpose, there remains a need for improvement in the relevant art.

SUMMARY

According to one example aspect of the invention, a control system for a hybrid power-split transmission of a vehicle is presented. The hybrid power-split transmission comprises at least two input shafts having a gear set therebetween and an output shaft, wherein one input shaft is coupled to an engine and another input shaft is connected to an electric motor. In one exemplary implementation, the control system comprises: an engine speed sensor configured to measure a rotational speed of the engine, a motor speed sensor configured to measure a rotational speed of the electric motor, and a controller configured to: determine a main torque profile for the electric motor based on a set of operating conditions of the vehicle, calculate a speed difference between the measured rotational speeds of the engine and the electric motor, determine a disturbance torque profile for the electric motor based on the calculated speed difference, and perform closed-loop control of the electric motor based on a combination of the main and disturbance torque profiles to mitigate a disturbance at the output shaft of the hybrid power-split transmission.

In some implementations, wherein the disturbance is at least one of rattle and clunk at the output shaft caused by a transient event. In some implementations, the transient event is a start of the engine using the electric motor. In some implementations, the controller is further configured to determine the main torque profile based on an average of the measured engine and electric motor speeds. In some implementations, the transient event is a stop of the engine. In some implementations, the transient event is a tip-in or tip-out of an accelerator device of the vehicle.

In some implementations, the disturbance torque profile modifies the main torque profile such that the speed of the electric motor matches the speed of the engine to mitigate the disturbance. In some implementations, the hybrid power-split transmission further comprises another electric motor coupled to another separate input shaft. In some implementations, the controller is further configured to control the other electric motor to pre-load at least some gears of the gear set to further mitigate the disturbance.

According to another example aspect of the invention, a method of controlling a hybrid power-split transmission of a vehicle is presented. The hybrid power-split transmission comprises at least two input shafts having a gear set therebetween and an output shaft, wherein one input shaft is coupled to an engine and another input shaft is connected to an electric motor. In one exemplary implementation, the method comprises: obtaining, by a controller of the vehicle, measured rotational speeds of the engine and the electric motor, determining, by the controller, a main torque profile for the electric motor based on a set of operating conditions of the vehicle, calculating, by the controller, a speed difference between the measured rotational speeds of the engine and the electric motor, determining, by the controller, a disturbance torque profile for the electric motor based on the calculated speed difference, and performing, by the controller, closed-loop control of the electric motor based on a combination of the main and disturbance torque profiles to mitigate a disturbance at the output shaft of the hybrid power-split transmission.

In some implementations, the disturbance is at least one of rattle and clunk at the output shaft caused by a transient event. In some implementations, the transient event is a start of the engine using the electric motor. In some implementations, the controller is further configured to determine the main torque profile based on an average of the measured engine and electric motor speeds. In some implementations, the transient event is a stop of the engine. In some implementations, the transient event is a tip-in or tip-out of an accelerator device of the vehicle.

In some implementations, the disturbance torque profile modifies the main torque profile such that the speed of the electric motor matches the speed of the engine to mitigate the disturbance. In some implementations, the hybrid power-split transmission further comprises another electric motor coupled to another separate input shaft. In some implementations, the method further comprises controlling, by the controller, the other electric motor to pre-load at least some gears of the gear set to further mitigate the disturbance.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
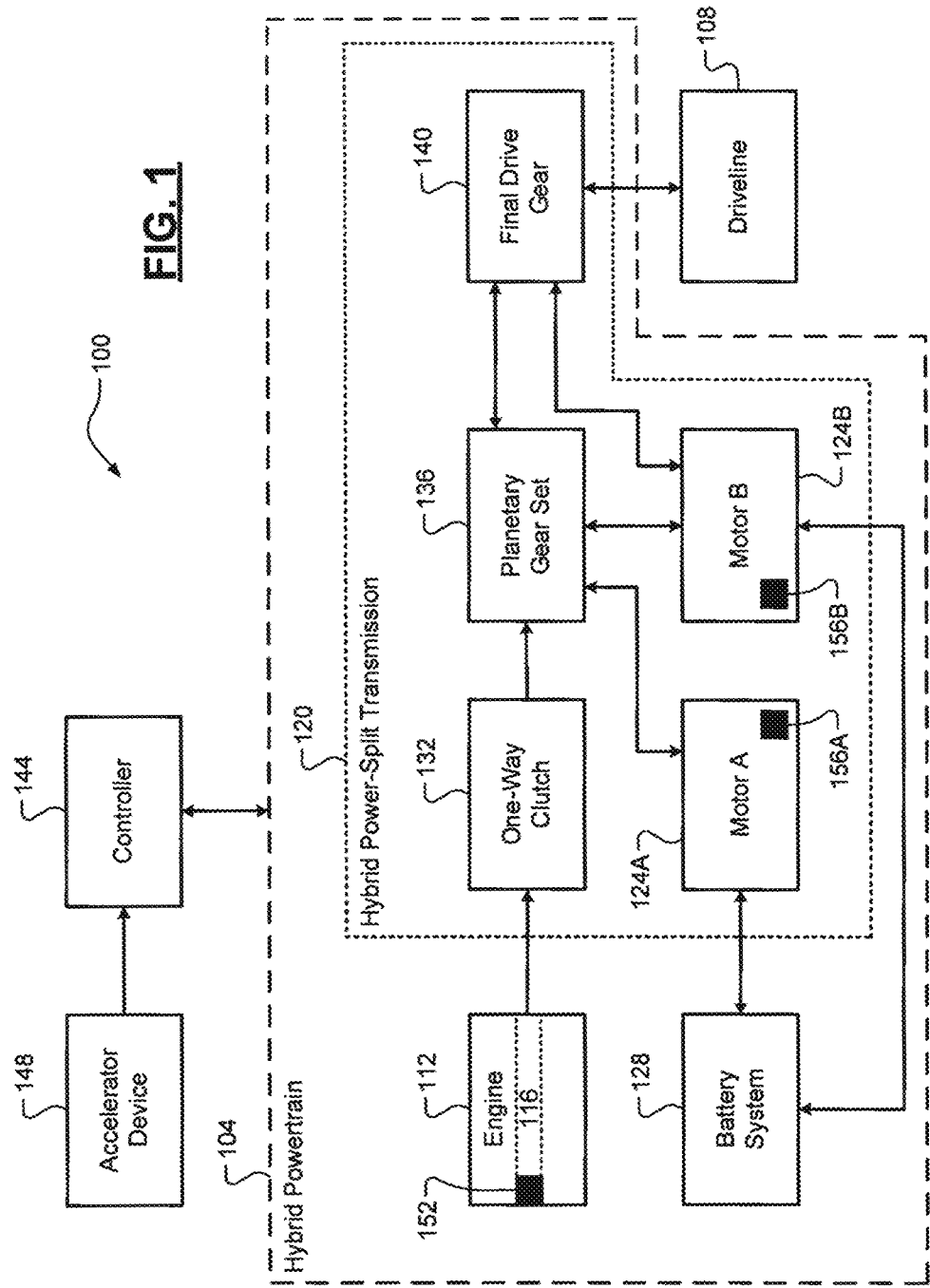
FIG. 1 is a functional block diagram of an example hybrid vehicle having a hybrid power-split transmission according to some implementations of the present disclosure.

Referring now to FIG. 1, a functional block diagram of an example hybrid vehicle 100 is illustrated. The hybrid vehicle 100 (hereinafter, "vehicle 100") includes a hybrid powertrain 104 that provides torque to a driveline 108 (a differential, wheels, etc.). In the illustrated exemplary implementation, the hybrid powertrain 104 comprises an internal combustion engine 112 (hereinafter, "engine 112") that combusts an air/fuel mixture to generate drive torque at a crankshaft 116 and a hybrid power-split transmission 120 (hereinafter, "transmission," and also known as an "electrically variable transmission," or EVT). In one exemplary implementation, the engine 112 is an Atkinson cycle engine having a compression ratio of approximately 12.5:1. This type of engine 112 is able to utilize a maximum amount of power generated by combustion of the air/fuel mixture, thereby increasing performance of the hybrid vehicle 100. One drawback of this type of engine 112 is poor power/performance at low speeds. The transmission 120, however, is able to generate drive torque to compensate for the poor power/performance of the engine 112, particularly at low speeds. It will be appreciated that other suitable engine configurations could be utilized.

Figure 2:
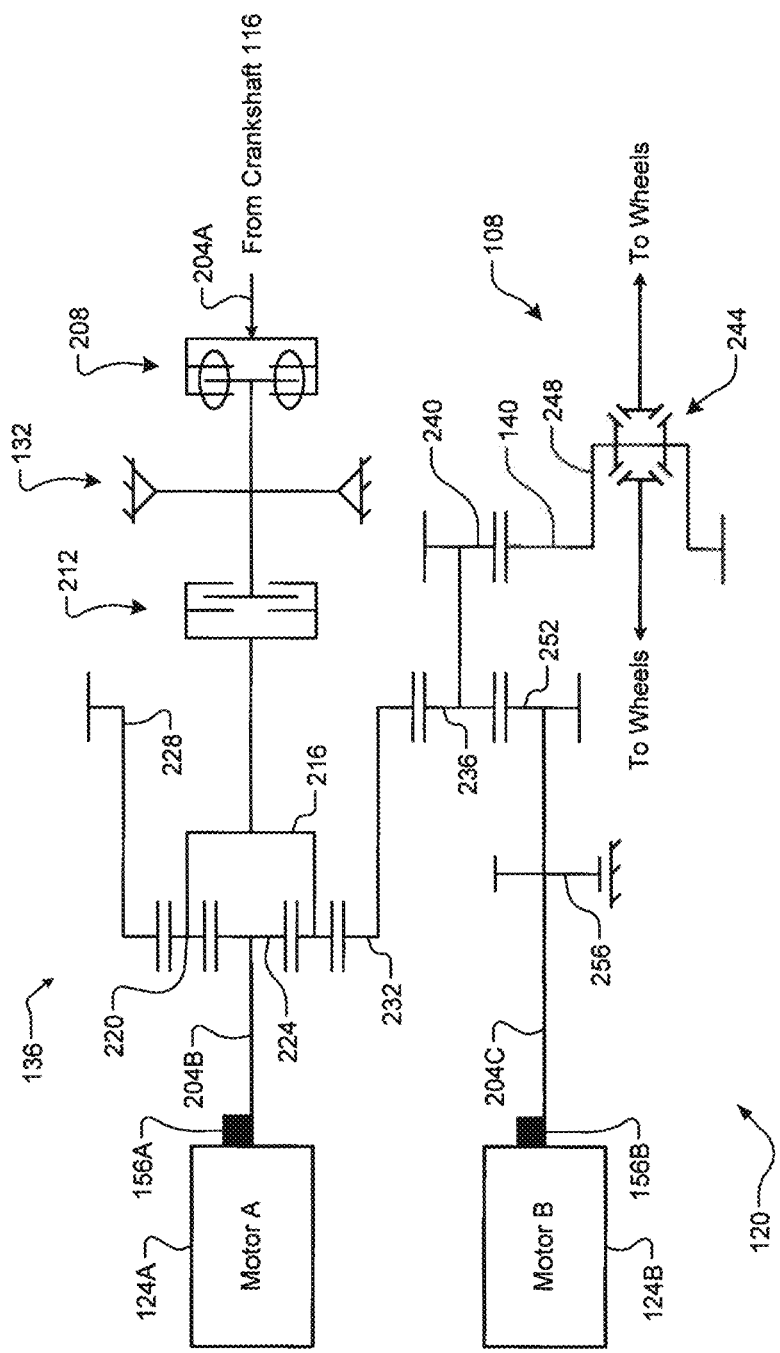
FIG. 2 is a schematic diagram of an example configuration of the hybrid power-split transmission according to some implementations of the present disclosure.

The transmission 120 comprises first and second electric motors 124A, 124B (collectively, "electric motors 124") powered by a battery system 128. The transmission 120 further comprises a one-way clutch 132, a planetary gear set 136, and a final drive gear 140. The engine 112 is selectively connected to the planetary gear set 136 via the one-way clutch 132. Electric motor 124A is also connected to the planetary gear set 136, which in turn is connected to the driveline 108 via the final drive gear 140. Electric motor 124B is connected to both the planetary gear set 136 and directly to the final drive gear 140 such that the electric motors 124A, 124B and the planetary gear set 136 are able to achieve a wide range of gear ratios. Details of this planetary gear set 136 are shown in FIG. 2 and discussed in greater detail below. The electric motors 124A, 124B are also configured to recharge the battery system 128 (e.g., via regenerative braking techniques).

A controller 144 controls operation of the hybrid powertrain 104. This includes, but is not limited to, controlling combinations of the engine 112 and the one-way clutch 132 and the electric motors 124A, 124B to achieve a desired torque output and a desired gear ratio of the transmission 120. The controller 144 receives driver input from an accelerator device 148 (e.g., an accelerator pedal). The controller 144 also receives speed measurements from various speed sensors. These include, for example, an engine speed sensor 152 that measures a rotational speed of the engine 112 (i.e., the crankshaft 116), a first motor speed sensor 156A that measures a rotational speed of electric motor 124A, and a second motor speed sensor that measures a rotational speed of electric motor 124B. These measured speeds are utilized by the controller to perform disturbance (i.e., rattle and/or clunk) mitigation at an output shaft of the transmission 120, which is illustrated in FIG. 2 and discussed in more detail below.

Referring now to FIG. 2 and with continued reference to FIG. 1, a schematic diagram of the transmission 120 is illustrated. The transmission 120 comprises three separate input shafts 204A, 204B, and 204C. Input shaft 204A is coupled to the crankshaft 116 of the engine 112. A flywheel and damper 208 is connected to input shaft 204A and the one-way clutch 132. A torque limiting or breakaway clutch 212 is connected to the one-way clutch 132 and a carrier gear 216 of the planetary gear set 136. The planetary gear set 136 further comprises a planetary pinion gear 220, a sun gear 224, and a main shaft gear 228. The sun gear 224 is connected to input shaft 204B, which in turn is coupled to an output shaft of electric motor 124A. Motor speed sensor 156A measures the rotational speed of the input shaft 204B (or the output shaft of the electric motor 124A, which is the same).

The planetary gear set 136 further comprises a ring gear 232 connected to the planetary pinion gear 220 and a separate transfer/idler gear 236. A final drive pinion gear 240 is connected to the transfer/idler gear 236 and the final drive gear 140. The final drive gear 140 is also connected to a differential 244 via an output shaft 248 of the transmission 120. The differential 244 splits the final driveshaft torque to the wheels of the driveline 108. The transfer/idler gear 236 is also connected to another pinion gear 252. A park clutch 256 is connected to the pinion gear and input shaft 204C, which in turn is coupled to an output shaft of electric motor 124B. Similar to electric motor 124A, motor speed sensor 156B measures a rotational speed of input shaft 204C (or the output shaft of the electric motor 124B, which is the same).

As previously discussed, when the rotational speeds of the engine 112 and electric motor 124A are different, a disturbance could occur at the planetary gear set 136, which is then transmitted to the output shaft 248 of the transmission 120. This is particularly true for transient events where electric motor and engine speed widely vary. Non-limiting examples of these transient events include engine start (i.e., using the electric motor), engine stop, and tip-in/tip-out of the accelerator device 148. One solution to mitigate this disturbance is to "pre-load" the planetary gear set 136 using electric motor 124B. This involves the electric motor 124B driving the various gears such that there is no gap present between the gear teeth. By eliminating the gap between the gear teeth, gear lash is mitigated, thereby mitigating the disturbance. This technique, however, only partially mitigates the disturbance and also does not solve the core problem. The techniques of the present disclosure operate to synchronize the speeds of the engine 112 and electric motor 124A, thereby mitigating or eliminating the source of the disturbance.

Figure 3A:
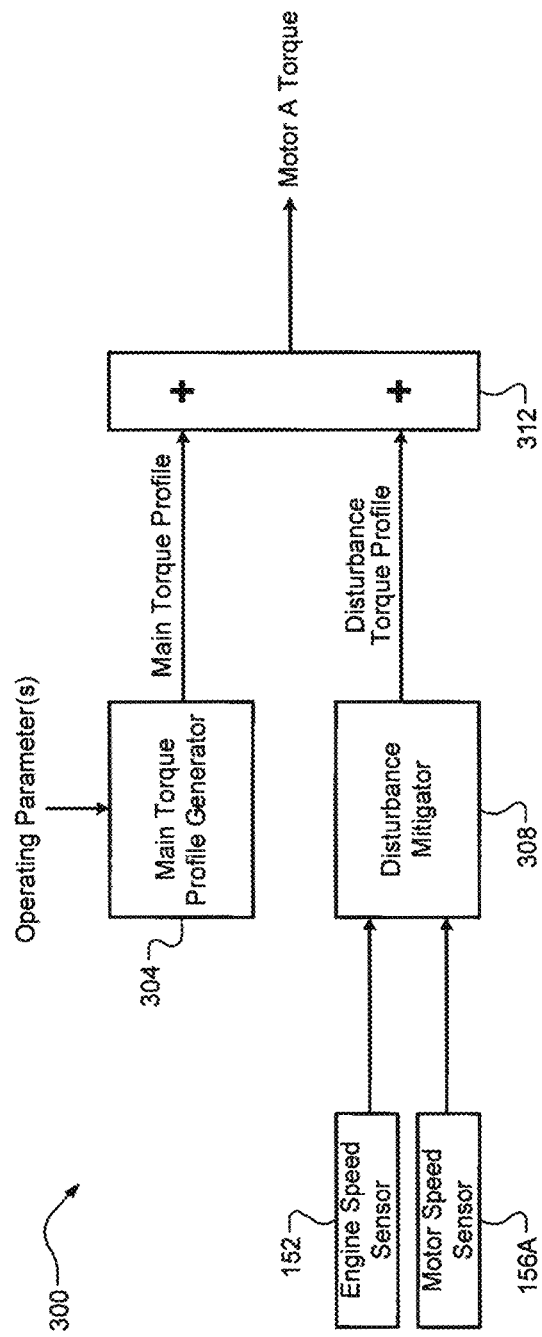
FIGS. 3A-3B are functional block diagrams of example control architectures for mitigating clunk and rattle in a hybrid power-split transmission according to some implementations of the present disclosure.

Referring now to FIG. 3A, a first example control architecture 300 is illustrated. This control architecture 300 represents a generic control architecture that could be applicable to any transient events and could be implemented by controller 144. A main torque profile generator 304 generates a main torque profile for electric motor 124A based on a set of operating parameters of the vehicle 100. This main torque profile depends on the type of operation being performed (engine start, engine stop, acceleration, deceleration, etc.) and the set of operating parameters include any suitable parameters for determining the amount of torque needed from the electric motor 124A. In some implementations, various main torque profiles for various operating procedures may be predetermined and stored at a memory of the controller 144. A disturbance mitigator 308 calculates a speed difference between the measured engine and motor speeds received from sensors 152 and 156A. The disturbance mitigator 308 also determines a disturbance torque profile based on this calculated speed difference. The main torque profile and the disturbance torque profile are both fed to a combination block 312 (e.g., a summation) that generates a motor torque command for electric motor 124A based on a combination of the profiles.

Figure 3B:
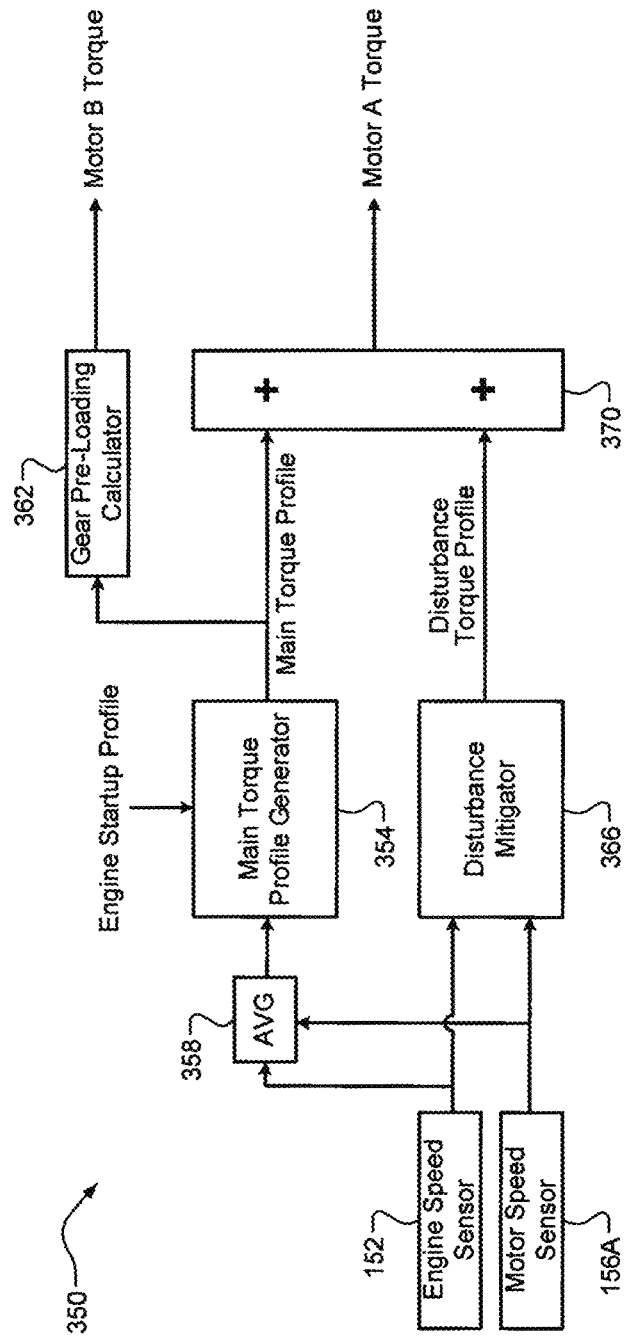

Referring now to FIG. 3B, a second example control architecture 350 is illustrated. This control architecture 350 represents a specific control architecture applicable for engine start transient events and could be implemented by controller 144. A main torque profile generator 354 generates a main torque profile according to an engine start profile (e.g., a desired engine speed for firing the engine 112). The main torque profile generator 354, however, also takes into account an average, as calculated by average block 358, of the measured engine and motor speeds received from sensors 152 and 156A. Using the average of these speeds could result in the main torque profile being adjusted to provide a smoother engine start. In some implementations, the main torque profile is also fed to a gear pre-loading calculator 362 that determines a motor torque command for electric motor 124B to pre-load gears of the transmission 120 to further mitigate the disturbance at the transmission output shaft. Similar to the configuration 300 of FIG. 3A, a disturbance mitigator 366 calculates the speed difference and determines a disturbance torque profile. Also similar to the configuration 300 of FIG. 3A, a combination block 370 (e.g., a summation) determines the motor torque command for electric motor 124A based on a combination of the profiles.

Figure 4:
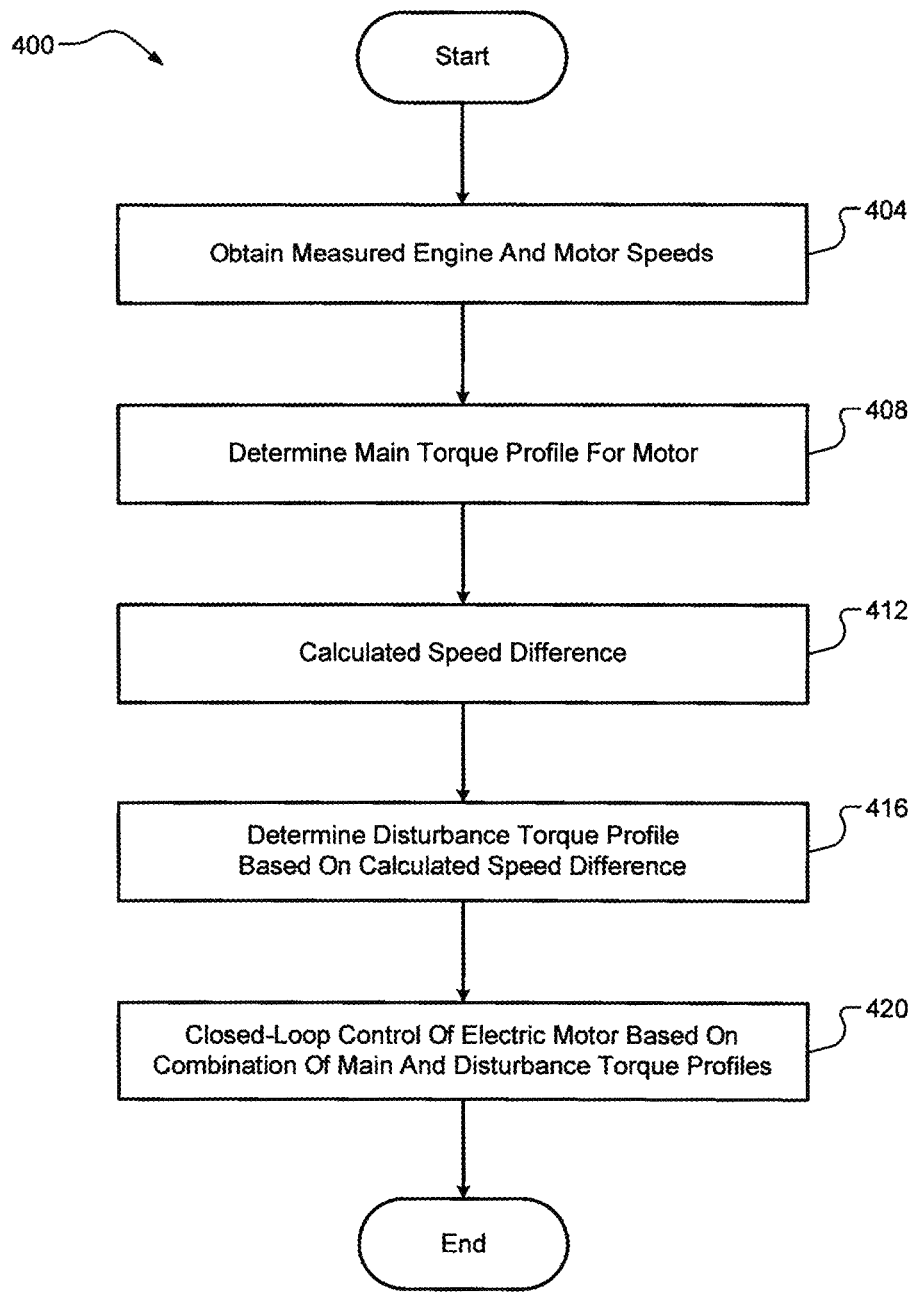
FIG. 4 is a flow diagram of an example method of clunk and rattle mitigation for a hybrid power-split transmission according to some implementations of the present disclosure.

Referring now to FIG. 4, a flow diagram of an example method 400 of clunk and rattle mitigation for the hybrid power-split transmission is illustrated 120. At 404, the controller 144 obtains the measured engine speed (e.g., from the engine speed sensor 152) and the measured motor speed (e.g., from motor speed sensor 156A). At 408, the controller 144 determines a main torque profile for the first electric motor 124A based on the set of vehicle operating parameters. At 412, the controller 144 calculates a speed difference between the measured engine and electric motor speeds. At 416, the controller 144 determines a disturbance torque profile based on the calculated speed difference. At 420, the controller 144 performs closed-loop control of the electric motor 124A based on a combination of the main and disturbance torque profiles. The disturbance torque profile, for example, could be an oscillating signal to cancel the disturbance caused by the main torque profile. This closed-loop control involves continuing to monitor and calculate the speed difference until the disturbance at the transmission output shaft has been eliminated or mitigated as much as desired.

It will be appreciated that the term "controller" as used herein refers to any suitable control device or set of multiple control devices that is/are configured to perform at least a portion of the techniques of the present disclosure (an engine control unit, a transmission control unit, a hybrid control unit, etc.). Non-limiting examples of the controller include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a hybrid power-split transmission of a vehicle, the hybrid power-split transmission comprising at least two input shafts having a gear set therebetween and an output shaft, wherein one input shaft is coupled to an engine and another input shaft is connected to an electric motor, the control system comprising:
an engine speed sensor configured to measure a rotational speed of the engine;
a motor speed sensor configured to measure a rotational speed of the electric motor; and
a controller configured to:
determine a main torque profile for the electric motor based on a set of operating conditions of the vehicle;
calculate a speed difference between the measured rotational speeds of the engine and the electric motor;
determine a disturbance torque profile for the electric motor based on the calculated speed difference; and
perform closed-loop control of the electric motor based on a combination of the main and disturbance torque profiles to mitigate a disturbance at the output shaft of the hybrid power-split transmission.

2. The control system of claim 1, wherein the disturbance torque profile modifies the main torque profile such that the speed of the electric motor matches the speed of the engine to mitigate the disturbance.

3. The control system of claim 1, wherein the hybrid power-split transmission further comprises another electric motor coupled to another separate input shaft.

4. The control system of claim 3, wherein the controller is further configured to control the other electric motor to pre-load at least some gears of the gear set to further mitigate the disturbance.

5. The control system of claim 1, wherein the disturbance is at least one of rattle and clunk at the output shaft caused by a transient event.

6. The control system of claim 5, wherein the transient event is a start of the engine using the electric motor.

7. The control system of claim 6, wherein the controller is further configured to determine the main torque profile based on an average of the measured engine and electric motor speeds.

8. The control system of claim 5, wherein the transient event is a stop of the engine.

9. The control system of claim 5, wherein the transient event is a tip-in or tip-out of an accelerator device of the vehicle.

10. A method of controlling a hybrid power-split transmission of a vehicle, the hybrid power-split transmission comprising at least two input shafts having a gear set therebetween and an output shaft, wherein one input shaft is coupled to an engine and another input shaft is connected to an electric motor, the method comprising:
obtaining, by a controller of the vehicle, measured rotational speeds of the engine and the electric motor;

determining, by the controller, a main torque profile for the electric motor based on a set of operating conditions of the vehicle;

calculating, by the controller, a speed difference between the measured rotational speeds of the engine and the electric motor;

determining, by the controller, a disturbance torque profile for the electric motor based on the calculated speed difference; and performing, by the controller, closed-loop control of the electric motor based on a combination of the main and disturbance torque profiles to mitigate a disturbance at the output shaft of the hybrid power-split transmission.

11. The method of claim 10, wherein the disturbance is at least one of rattle and clunk at the output shaft caused by a transient event.

12. The method of claim 11, wherein the transient event is a start of the engine using the electric motor.

13. The method of claim 12, wherein the controller is further configured to determine the main torque profile based on an average of the measured engine and electric motor speeds.

14. The method of claim 11, wherein the transient event is a stop of the engine.

15. The method of claim 11, wherein the transient event is a tip-in or tip-out of an accelerator device of the vehicle..

16. The method of claim 10, wherein the disturbance torque profile modifies the main torque profile such that the speed of the electric motor matches the speed of the engine to mitigate the disturbance.

17. The method of claim 10, wherein the hybrid power-split transmission further comprises another electric motor coupled to another separate input shaft.

18. The method of claim 17, further comprising controlling, by the controller, the other electric motor to pre-load at least some gears of the gear set to further mitigate the disturbance.

* * * * *